(12) United States Patent
West, Jr. et al.

(10) Patent No.: US 8,508,478 B2
(45) Date of Patent: Aug. 13, 2013

(54) DEVICES, SYSTEMS AND METHODS FOR REMOTE CONTROL INPUT

(75) Inventors: Earle H. West, Jr., Morganville, NJ (US); Nathan E. West, Morganville, NJ (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 724 days.

(21) Appl. No.: 12/567,348

(22) Filed: Sep. 25, 2009

(65) Prior Publication Data

US 2011/0074679 A1    Mar. 31, 2011

(51) Int. Cl.
*G09G 5/08* (2006.01)
*G09G 5/00* (2006.01)
*G06F 3/041* (2006.01)

(52) U.S. Cl.
USPC ........... 345/163; 345/173; 345/156; 455/403; 455/41.2

(58) Field of Classification Search
None
See application file for complete search history.

(56) References Cited

U.S. PATENT DOCUMENTS

| | | | |
|---|---|---|---|
| 6,954,355 B2 | 10/2005 | Gerstner | |
| 2005/0007343 A1 | 1/2005 | Butzer | |
| 2006/0267940 A1 * | 11/2006 | Groom et al. | 345/163 |
| 2007/0139373 A1 | 6/2007 | Simon | |
| 2008/0066161 A1 * | 3/2008 | Ohhira | 726/4 |
| 2008/0096551 A1 | 4/2008 | Huang | |
| 2009/0143057 A1 * | 6/2009 | Arun et al. | 455/418 |
| 2009/0186652 A1 | 7/2009 | Combs | |
| 2010/0066677 A1 * | 3/2010 | Garrett et al. | 345/163 |

OTHER PUBLICATIONS

Tom Simonite, "Cameraphone used to control computers in 3D," published Jan. 15, 2008, accessed on Sep. 8, 2009 at http://www.newscientist.com/article/dn13187-cameraphone-used-to-control-computers-in-3d.html ,see all.

Nick Pears et al, "Display Registration for Device Interaction: A proof of Principle Prototype," accessed on Sep. 8, 2009 at http://www-users.cs.york.ac.uk/~nep/research/dispreg/visapp08_115.pdf see all.

Gesturetek, "Eyemobile Engine," accessed on Sep. 7, 2009 at http://www.gesturetekmobile.com/eyemobileengine.php see all.

* cited by examiner

*Primary Examiner* — Andrew L Sniezek
(74) *Attorney, Agent, or Firm* — Guntin & Gust, PLC; Ralph Trementozzi (57) ABSTRACT

Systems, methods, and devices are disclosed which allow for remote mouse input from a portable network device to an external interface device using optical flow sensors detecting motion of the portable mouse device. Various techniques include systems, methods, and devices which manage this remote mouse input connection between one portable network device and multiple external interface devices, and between one external interface device and multiple portable network devices.

20 Claims, 10 Drawing Sheets

List of Found Devices

-GenericTek 182

-HW Video Display

-GenericTek Home
Gaming System 2     380

-ConnectSys Mobile Laptop 4

-HW 3 Laptop

DEVICES, SYSTEMS AND METHODS FOR REMOTE CONTROL INPUT

BACKGROUND OF THE INVENTION

1. Field of the Invention

The present invention relates to the field of human interface devices. In particular, the present invention relates to optical detection of device motion as an input to human interface devices.

2. Background of the Invention

Among other factors, the rise of robust networks, such as the Internet and mobile phone networks, has accelerated the convergence between what had previously been, for consumers, distinct types of devices: cellular telephones, computers, and displays. Such convergence has not only meant novel ways of interfacing between them but also the creation of devices, such as smartphones or interactive video displays that straddle the border between them.

Additional advances in technology have presented new problems for human interface devices. As computing devices become smaller and smaller (first with laptops and later with PDAs and netbooks), it has been more and more difficult to include a "mouse" interface into these devices. Many solutions, such as touch pads, significantly increase the size of such devices or are unwieldy to use for many applications that require sensitive control of the cursor, such as graphics applications.

Aside from the demands of smaller form factors, new devices, such as interactive video displays or interactive televisions present more fundamental obstacles to using a traditional mouse input. For such devices, it cannot be assumed there will be a flat surface near the device to move a mouse over or even that the user will be close to the device. If such a device is deployed in public, specialized interactive technology (such as TV remote controls or their analogues) created specifically for the device will not work because everyone who would potentially use the device must have access to the technology. If the device is not used in public, then specialized interactive devices may be useful. However, a private environment with many such devices would require the user to maintain many such specialized interactive devices.

Some of the problems outlined for the human interface of such novel devices have been addressed by allowing users to use their cellular telephones for mouse input. For example, some BLUETOOTH-enabled cellular telephones allow users to use the cellular telephone keypad as a mouse input to control the cursors on computers. Typically, via a wireless connection between the cellular telephone and the computer, pressing buttons on the keypad cause the cursor to move up, down, left, or right on the screen. Thus, such input does not truly capture the full generality of a mouse input, which can be directed smoothly in any direction.

Thus, there is a clear need for devices, methods, and systems which allow for cellular telephones to act as a fully general mouse input and that allow for management of multiple cellular telephone mouse connections to one device and multiple connections by one cellular telephone mouse to multiple devices.

SUMMARY OF THE INVENTION

The present invention discloses systems, methods, and devices which allow for remote mouse input from a portable network device to an external interface device using optical flow sensors detecting motion of the portable mouse device. Exemplary embodiments of the present invention include systems, methods, and devices which manage this remote mouse input connection between one portable network device and multiple external interface devices, and between one external interface device and multiple portable network devices.

In one exemplary embodiment, the present invention is a portable network device. The portable network device includes a microprocessor, a display in communication with the microprocessor, a camera in communication with the microprocessor, a memory in communication with the microprocessor, an optical flow logic stored on the memory, and a transceiver in communication with the microprocessor. The optical flow logic determines a plurality of portable network device motion information using the camera and the transceiver transmits this motion information.

In another exemplary embodiment, the present invention is a system. The system comprises a portable network device having a camera and an optical flow logic, and an external interface device in communication with the portable network device. The portable network device transfers motion information from the camera as a remote mouse input to the external interface device.

In yet another exemplary embodiment, the present invention is a method for controlling an external interface device using portable network device having a camera. The method includes establishing a remote mouse input connection between the external interface device and a portable network device, determining a plurality of motion information of the portable network device via an optical flow sensor, translating the motion information into a mouse input, and wirelessly transmitting the mouse input to the external interface device.

DETAILED DESCRIPTION OF THE INVENTION

The present invention discloses systems, methods, and devices which allow for remote mouse input from a portable network device to an external interface device using optical flow sensors detecting motion of the portable mouse device.

Exemplary embodiments of the present invention include systems, methods, and devices which manage this remote mouse input connection between one portable network device and multiple external interface devices, and between one external interface device and multiple portable network devices.

In one exemplary embodiment of the present invention, the portable network device is a cellular telephone with an optical flow logic on a device memory. The optical flow logic being responsible for implementing an appropriate optical flow algorithm, taking input from a device camera and a device keypad, and outputting a mouse input via a wireless connection to an external interface device.

In another exemplary embodiment of the present invention, the portable network device, via a device display, presents all detected wireless devices to the user for selection of to which device to send remote mouse input. In one further exemplary embodiment of the present invention, the external interface device runs a configuration program allowing for management of portable network devices enabled to send it remote mouse input.

As used herein and throughout this disclosure, a "portable network device" refers to any portable device capable of wireless connection to external devices. Examples of such connection means include infrared connectivity or other optical communications channels, BLUETOOTH, other radio-frequency communications protocols, etc. Examples of such portable network devices include cellular telephones, smartphones, personal digital assistants (PDAs), netbooks, etc.

As used herein and throughout this disclosure, an "external interface device" refers to any device with a graphical user interface and capable of wireless connection to a portable network device. Examples of such external interface devices include PDAs, laptop computers, desktop computers, netbooks, interactive televisions, interactive video displays, set-top boxes etc. Examples of such wireless connections include infrared connectivity or other optical communications channels, BLUETOOTH, other radio-frequency communications protocols, etc.

As used herein and throughout this disclosure, "mouse input" refers to any directional input from the user to a graphical user interface. By this definition, one example of "mouse input" would be control of the cursor on a computer screen via a traditional computer mouse. A user pressing the "up" button on a remote control to scroll through a list of television programs on a television screen is another example.

As used herein and throughout this disclosure, a "remote mouse input connection" refers to a personal area network (PAN) established by which one or more portable network devices provide mouse input to an external interface device.

As used herein and throughout this disclosure, determining the "optical flow" of a successive set of images of a scene refers to determining, as a function of time, the relative movement between the observer and the scene constituting the images.

Figure 1A:
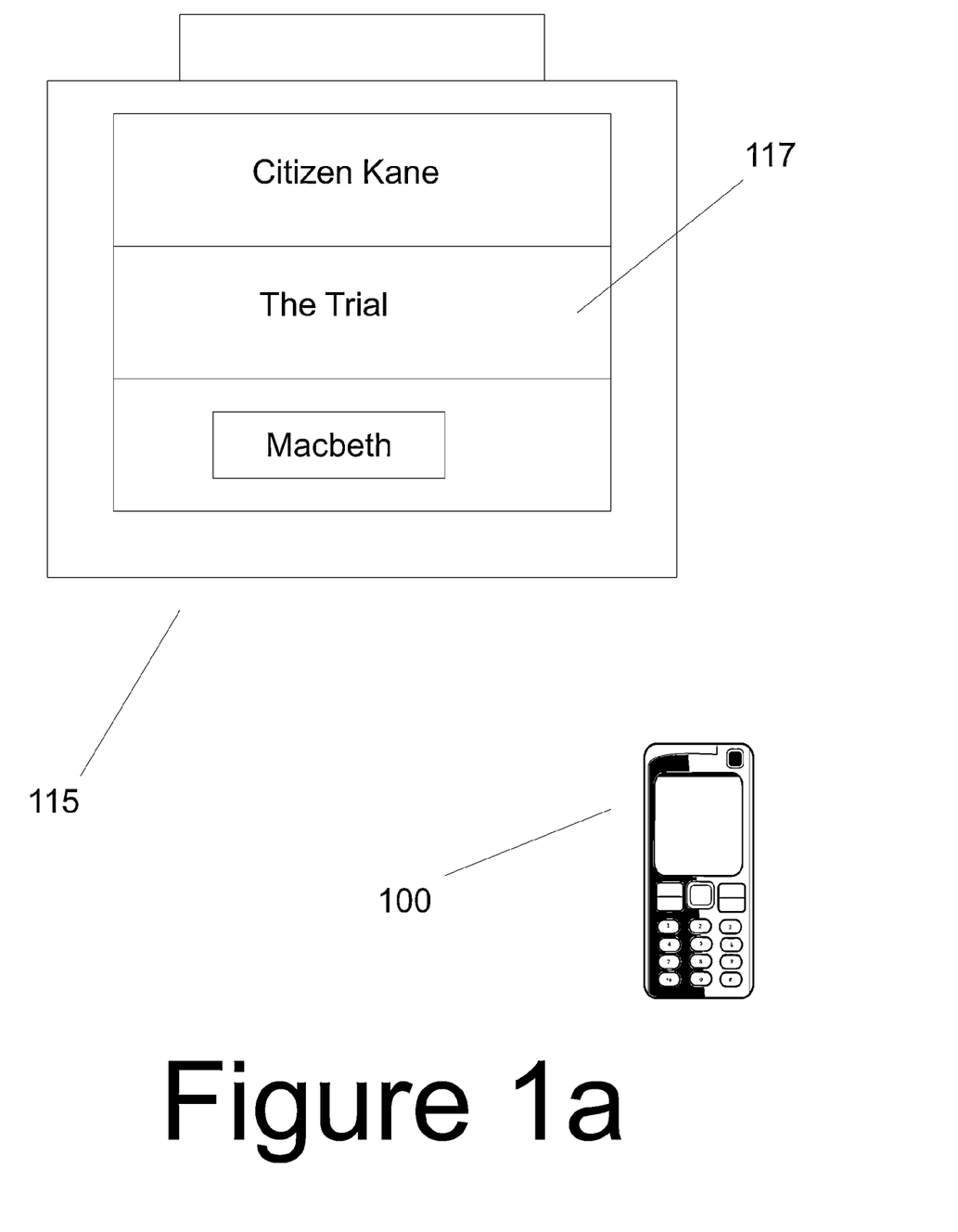
FIGS. 1A, 1B, and 1C display a series of user cases demonstrating capabilities, according to one exemplary embodiment of the present invention.
Figure 1B:
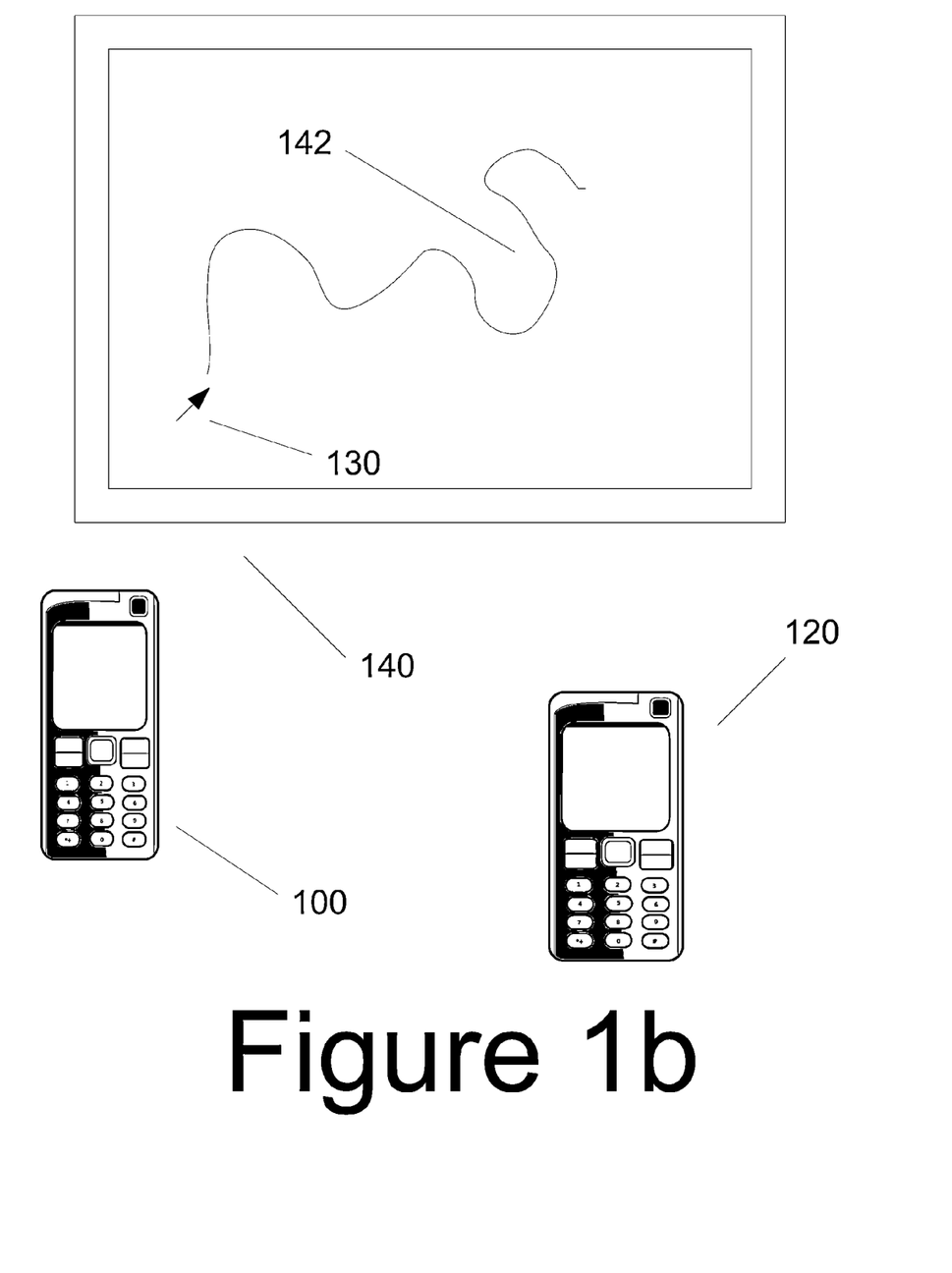
Figure 1C:
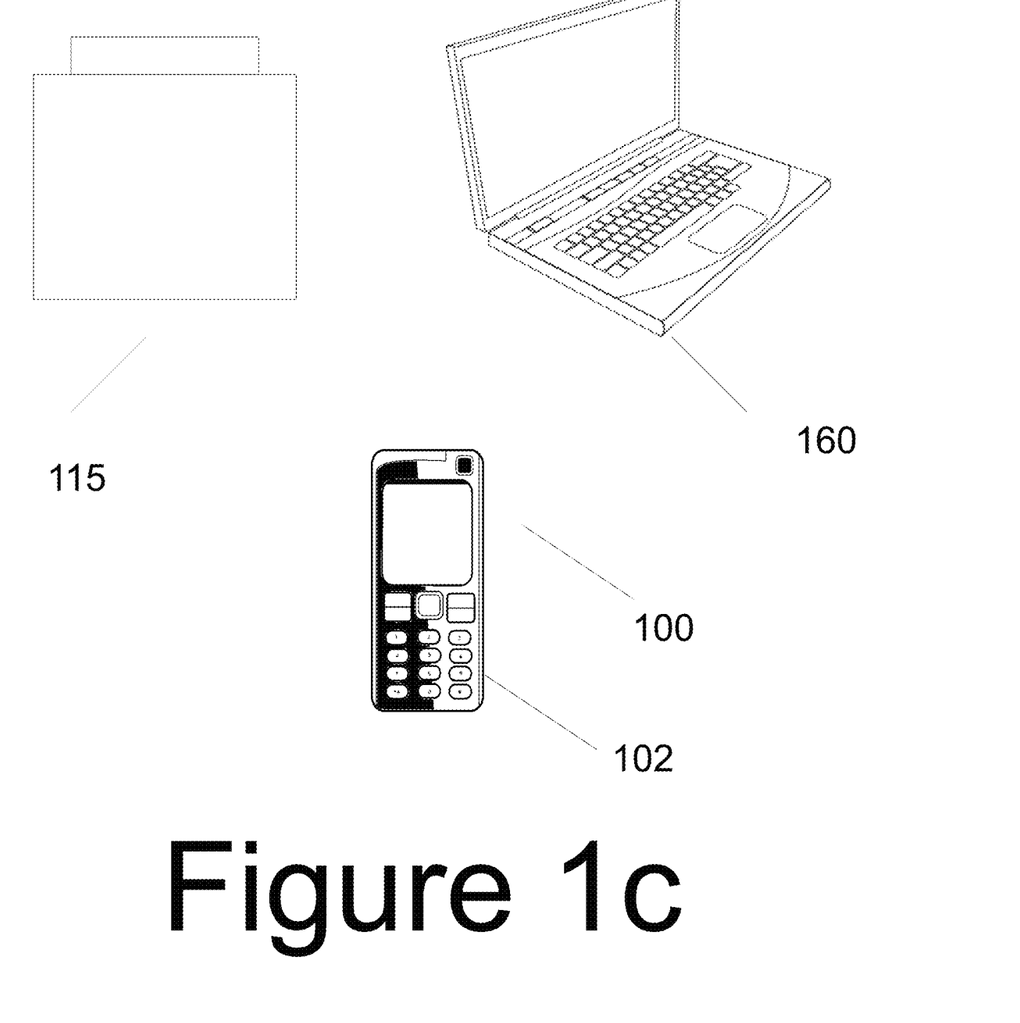

FIGS. 1A, 1B, and 1C display a series of user cases demonstrating capabilities of one exemplary embodiment of the present invention.

In FIG. 1A, portable network device 100 provides the means for user input to the graphical user interface of an interactive television 115 in one exemplary embodiment of the present invention. In this embodiment, portable network device 100 is a cellular telephone. The user provides input via a keypad and a digital camera of the portable network device. The input is interpreted by the optical flow logic as movement downward and a selection entry. The optical flow logic sends these commands through a wireless connection to interactive television 115 to select a movie to digitally record Macbeth via menu 117.

In FIG. 1B, a first portable network device of a first user 100 and a second portable network device of a second user 120 both provide remote mouse input to the graphical user interface by controlling a cursor 130 of a desktop computer 140 running a graphics program. The users collaborate on a computer drawing 142, in one embodiment of the present invention. Logic in the desktop computer responds to input from both portable network devices with movement of cursor 130 and selection entry.

In FIG. 1C, the user of portable network device 100, via a keypad 102, toggles between providing remote mouse input to the graphical user interfaces of a laptop computer 160 and an interactive television 115, in one embodiment of the present invention. A graphical user interface is provided on the portable network device which displays laptop computer 160 and interactive television 115 as remote mouse input options. If the user selects laptop computer 160, then a connection to laptop computer 160 provides remote mouse control. If the user selects interactive television 115, then a connection to interactive television 115 provides remote mouse control.

Figure 2A:
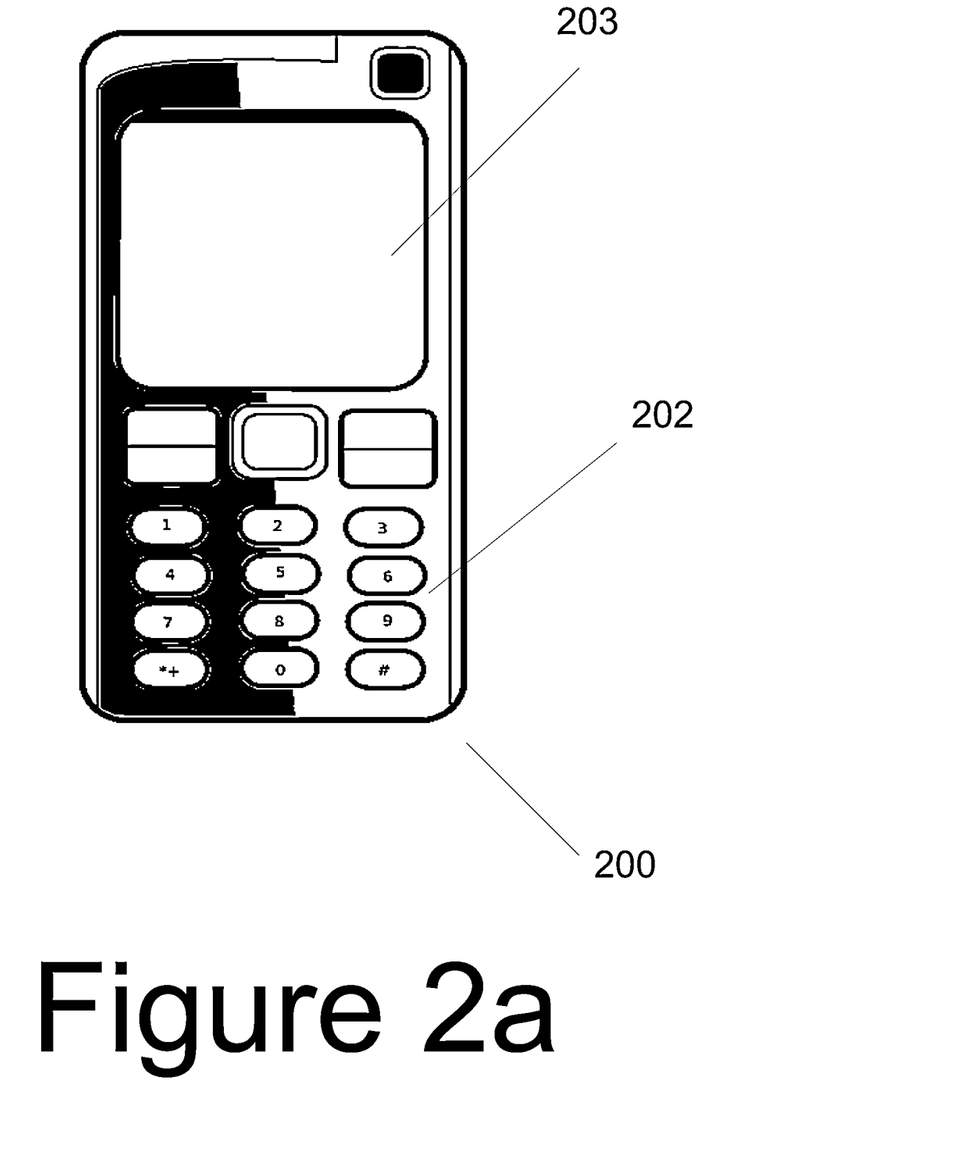
FIGS. 2A and 2B display views of a portable network device that provides remote mouse input to an external user interactive device via an optical flow sensor, according to one exemplary embodiment of the present invention.
Figure 2B:
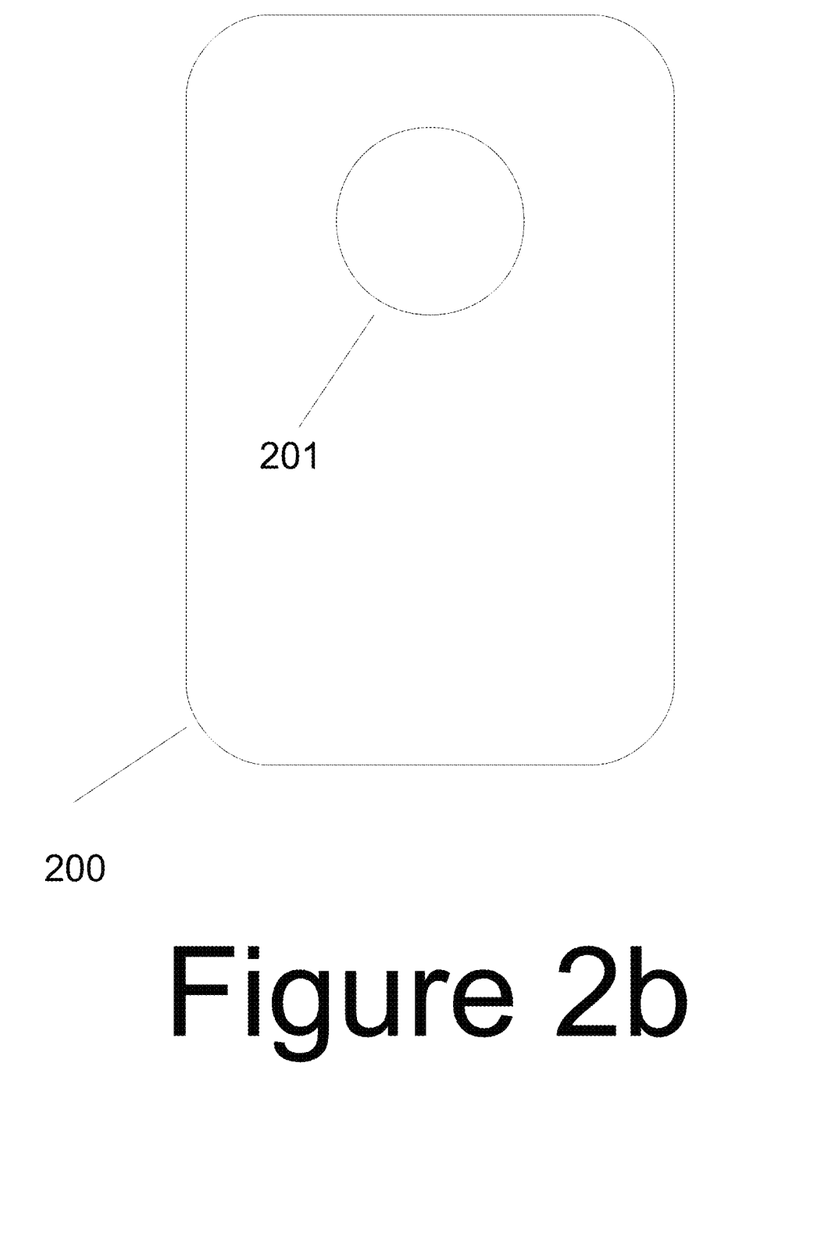

FIGS. 2A and 2B display views of a portable network device 200 that provides remote mouse input to an external user interactive device via an optical flow sensor, in one embodiment of the present invention. FIG. 2A displays a front view of portable network device 200 and FIG. 2B displays a back view of portable network device 200. In this embodiment, portable network device 200 includes a digital camera 201, a keypad 202, and a display 203. In this embodiment, digital camera 201 is any appropriate device for rendering an image into an electronic signal which can be stored by computer readable memory, including those using charged coupling devices (CCD) or CMOS chips. When using portable network device 200 as a remote mouse input, digital camera 201 captures successive images and compares them. The images are captured with sufficient frequency such that a portion of a previous image can be seen in a current image. The optical flow logic compares the images and determines a direction of movement of the portable network device from the directional offset of the common portion and a speed or amount of movement based on the distance of the common portions between the previous image and the current image. The directional offset is used to calculate a two-dimensional vector. Display 203 is any electronic screen capable of rendering an image from commands sent from the microprocessor. Display 203 is a an LCD screen.

Alternate embodiments feature an LED display while further embodiments feature a touch-screen display.

Figure 3A:
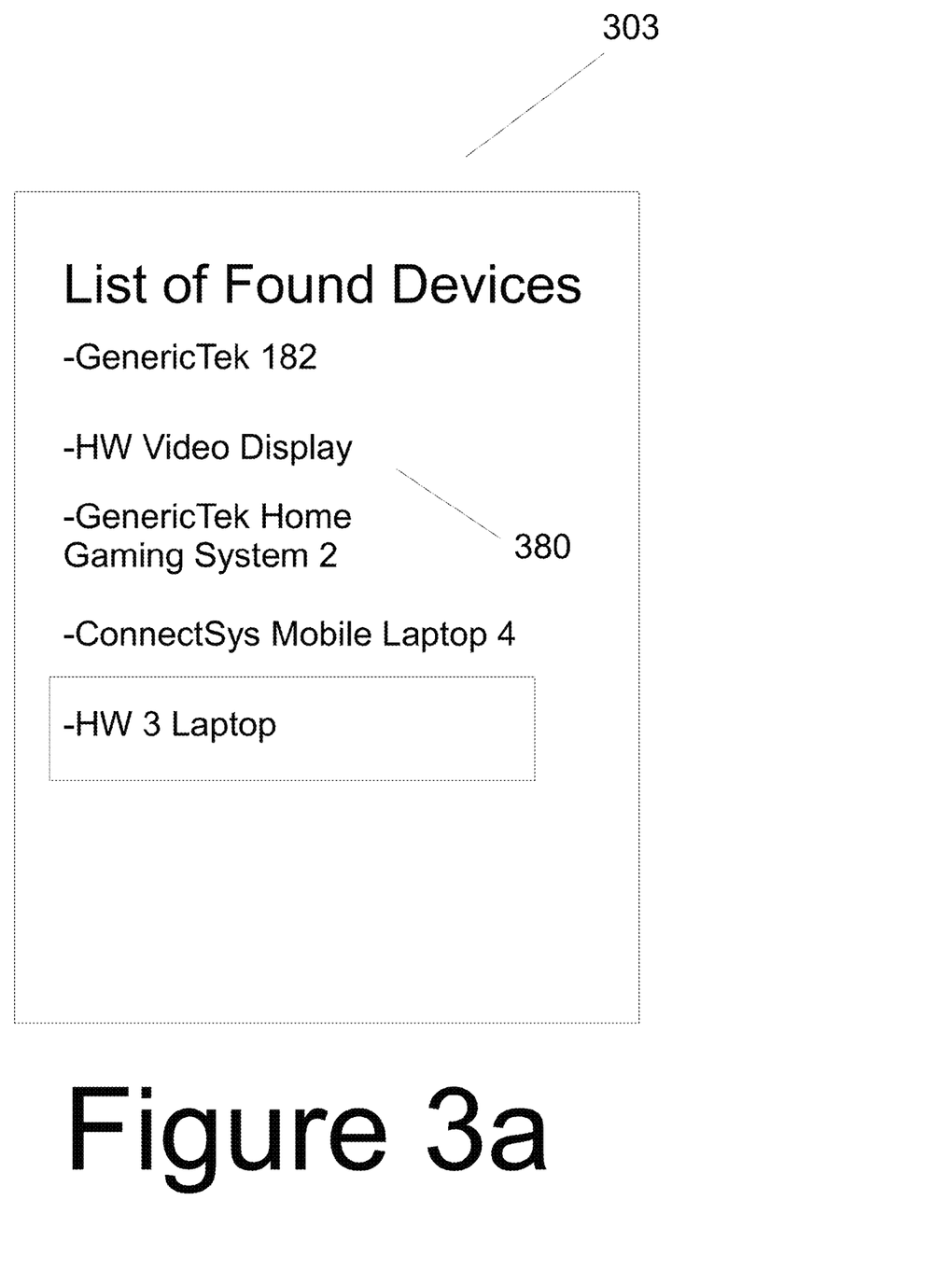
FIGS. 3A and 3B display screenshots of management schemes for remote mouse input connections between portable network devices and external interface devices, according to one exemplary embodiment of the present invention.
Figure 3B:
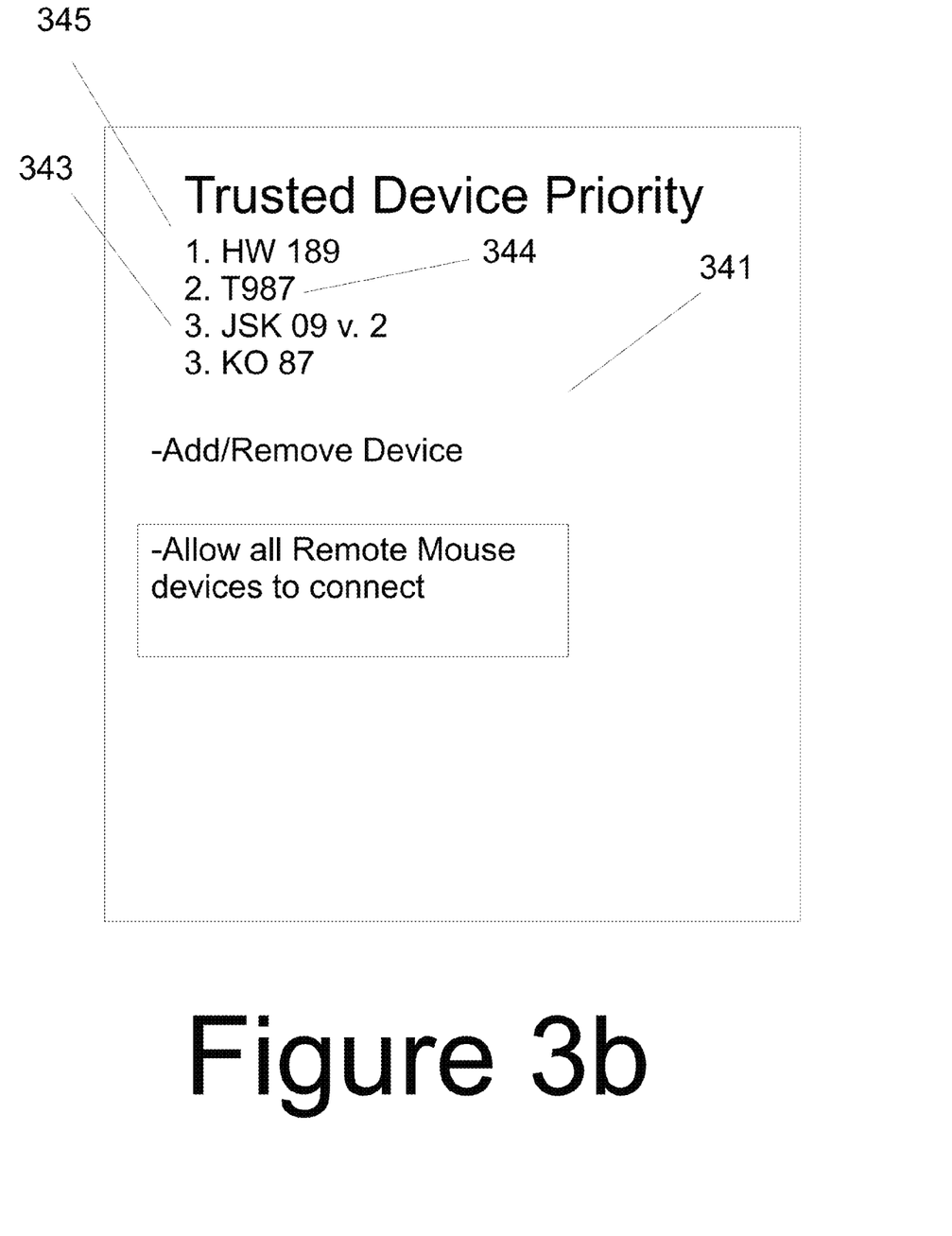

FIGS. 3A and 3B display screenshots of management schemes for remote mouse input connections between portable network devices and external interface devices, in one embodiment of the present invention.

FIG. 3A displays a screenshot demonstrating the dynamic management of a portable network device in a case where there are multiple external interface devices that are able to receive mouse input remotely, according to an exemplary embodiment of the present invention. In this embodiment, the portable network device connects to the multiple external interface devices via BLUETOOTH. In accordance with the BLUETOOTH communications protocol, the portable network device is constantly receiving invitations to connect via BLUETOOTH to appropriate external interface devices. In this embodiment, a driver running on the portable network device, through BLUETOOTH communications with all inrange external interface devices, determines what external interface devices are configured to accept remote mouse input. The driver then displays a list of remote mouse input-capable devices 380 on display 303 of the portable network device. The user, via keypad input, selects which device(s) he/she wishes to establish a remote mouse input connection with, and the driver establishes such a connection.

In an alternative embodiment, rather than the driver automatically detecting which BLUETOOTH-enabled external interface devices in range accept remote mouse input connections, the user selects from a list of all detected BLUETOOTH devices in range to establish a remote mouse input connection with the selected device. In an another alternative embodiment, the user, via the keypad, types in the name or media access control (MAC) address of the external interface device with which he/she wishes to establish a remote mouse input connection. These alternates use less power which can improve the life of a battery powering the portable network device.

In another alternative embodiment, rather than maintaining a BLUETOOTH connection to the external interface devices, the portable network device maintains an infrared connection or some other optical communications connection to the external interface devices. Other embodiments use other forms of wireless technology such as WiFi, cellular radio frequency (RF), near field communication (NFC), etc.

FIG. 3B displays a screenshot of an external interface device in a mode managing what devices it accepts remote mouse input connections from, according to an exemplary embodiment of the present invention. In this embodiment, via a graphical user interface 341 of the external interface device, the user selects to which portable network devices it accepts remote mouse input connections, and the priority of inputs when multiple inputs are received from different portable network devices. A display shows a list of trusted portable network devices 343, and each portable network device in list of trusted portable network devices 343 has a rank 345. In this embodiment, the names 344 of the devices correspond to BLUETOOTH device addresses. Rank 345 of the portable network device in list of trusted portable network devices 343 determines the priority of inputs received from the listed portable network devices, in the event multiple simultaneous inputs are received from different portable network devices. In this embodiment, the user also has options to add or remove a device from list of trusted portable network devices 343. As well, the user, via graphical user interface 341, has the option to allow all portable network devices capable of establishing a remote mouse input connection to the external interface device to do so. Though there is a graphical user interface which allows the user of the external interface device to configure what portable network devices are able to establish remote mouse input connections to the external interface device, the actual management of portable network devices permitted to establish such connections in some embodiments is handled via a software application running on an operating system of external interface device. In some embodiments this is established via a driver in communication with the BLUETOOTH transceiver of the external interface device. That is, in some embodiments, graphical user interface 341 is simply a portal to write user preferences to a device driver. In an alternative embodiment, the external interface device only accepts remote mouse input connections from a particular set of portable network devices. In this exemplary embodiment, the connection must be physically swapped out to allow connections to a different group of network interface devices.

Figure 4:
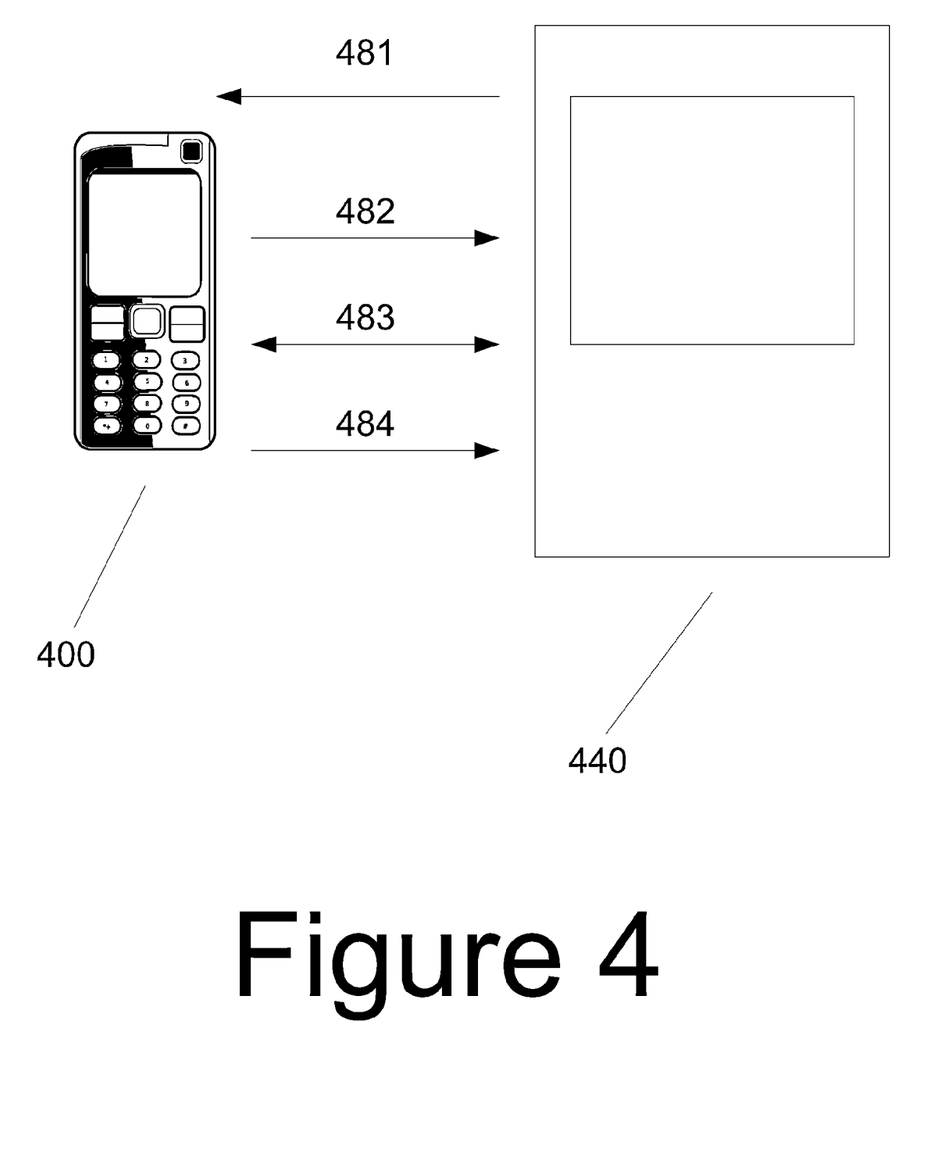
FIG. 4 displays the flow of information between a portable network device and an external interactive device while the remote mouse input connection is established and thereafter used to transfer mouse input to external interactive device, according to one exemplary embodiment of the present invention.

FIG. 4 displays the flow of information between a portable network device 400 and an external interactive device 440 while the remote mouse input connection is established and thereafter used to transfer mouse input to external interactive device 440 in one embodiment of the present invention. External interface device 440 sends out a BLUETOOTH signal determining what BLUETOOTH-enabled portable network devices are in range, 481. Portable network device 400 replies with its BLUETOOTH address and its capability to provide remote mouse input, 482. Thereupon, a personal area network providing for remote mouse input from personal network device 400 to external interactive device 440 is established, 483. At some later time, personal network device 400 sends, via the just-established personal area network, remote mouse input to external interface device 440, 484.

Figure 5:
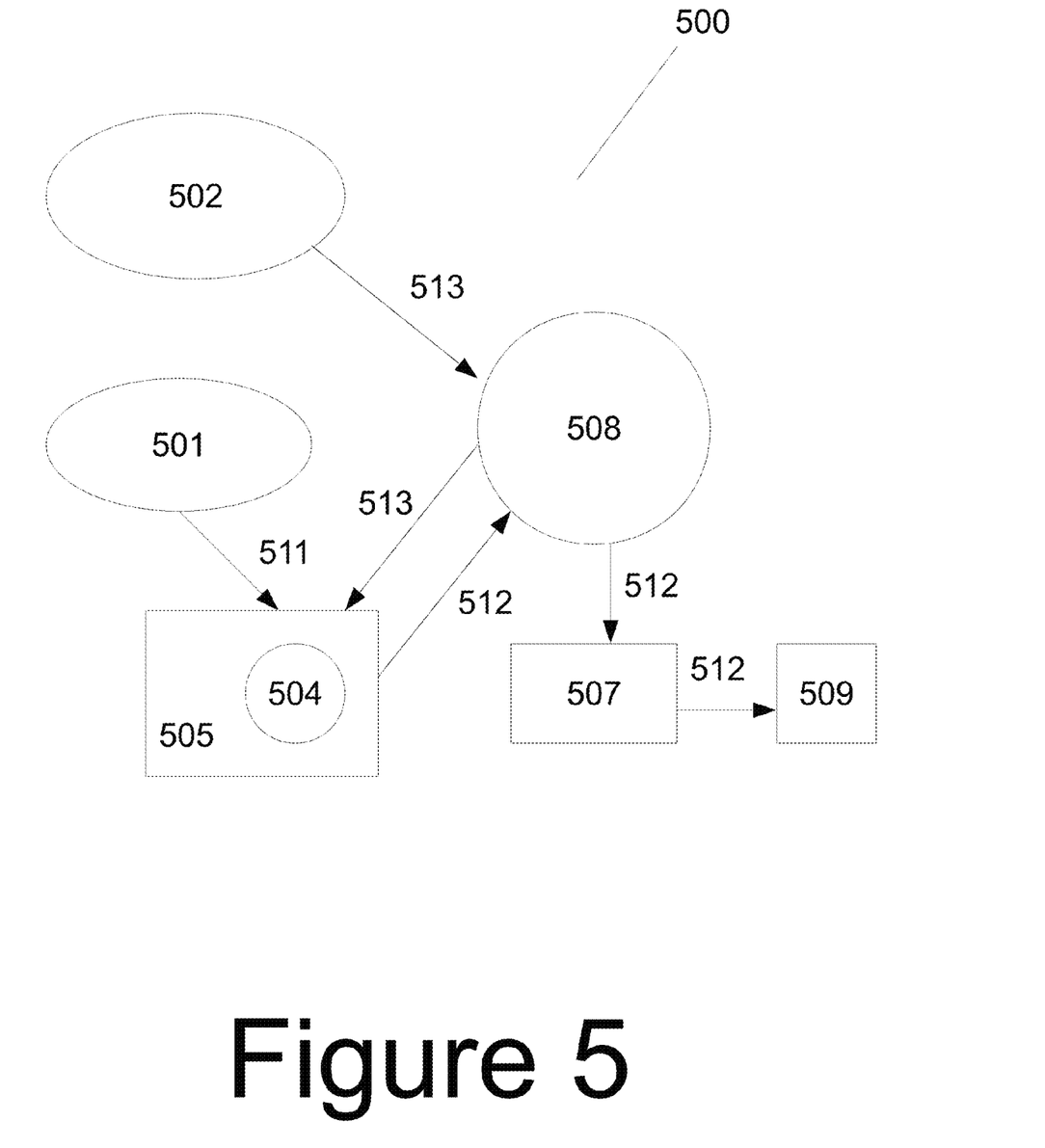
FIG. 5 displays a schematic diagram of the flow of information inside a portable network device as it translates portable network device movement into a radio-frequency signal transmitted by a BLUETOOTH antenna, once a remote mouse input connection has been established in one exemplary embodiment of the present invention.

FIG. 5 displays a schematic diagram of the flow of information inside a portable network device 500 as it translates portable network device movement into a radio-frequency signal transmitted by a BLUETOOTH antenna 509, once a remote mouse input connection has been established in one exemplary embodiment of the present invention. Portable network device 500 includes an onboard digital camera 501, a central processing unit 508, a BLUETOOTH transceiver 507, a BLUETOOTH antenna 509, a keypad 502, a memory 505, and an optical flow logic 504 on the memory. Onboard digital camera 501 translates the light image impinging upon its lens into an electric signal which is then sent as a time-stamped image file 511 to device memory 505. Also stored in device memory 505 is optical flow logic on the memory 504, directing the conversion of portable device movements into remote mouse input. Optical flow logic on the memory 504 implements an appropriate optical flow algorithm (e.g., "block matching"; "frequency domain based correlation"; "gradient based optical flow"), optimized for determining purely the 2-dimensional rectilinear motion of the portable network device, so that the present remote mouse input is determined. Optical flow logic on the memory 504 takes as input the two most recent successively stored image files from onboard digital camera 501 and outputs a 2-dimensional vector 512 corresponding to the desired motion of a cursor on the graphical user interface of the external interface device. Two dimensional vector 512 is read by central processing unit 508 for transmission, via BLUETOOTH transceiver 507 and BLUETOOTH antenna 509, to the external interface device as remote mouse input. After central processing unit 508 reads two dimensional vector 512, the oldest time-stamped image file is deleted from device memory 505. If at anytime during this process, the user presses a key on keypad 502, a bus interrupt is generated and a keypad input 513 is sent via central processing unit 508 to device memory 505 so that optical flow logic on the memory 504 is able to determine if keypad input 513 corresponds to known mouse commands. In some embodiments, the user configures optical flow logic on the memory 504 so that selected keys on keypad 502 correspond to a "left-click" as the remote mouse input and selected keys on keypad 502 correspond to a "right-click" as the remote mouse input.

Alternatively, the portable network device uses other forms of wireless communication. Other exemplary embodiments include cellular RF and WiFi transceivers. External interactive devices must use the same communication protocol as the portable network device. These can accommodate external interactive devices having cellular RF and WiFi transceivers themselves. Further embodiments include multiple transceivers to communicate with and control external interactive devices using one of many communication protocols.

Figure 6:
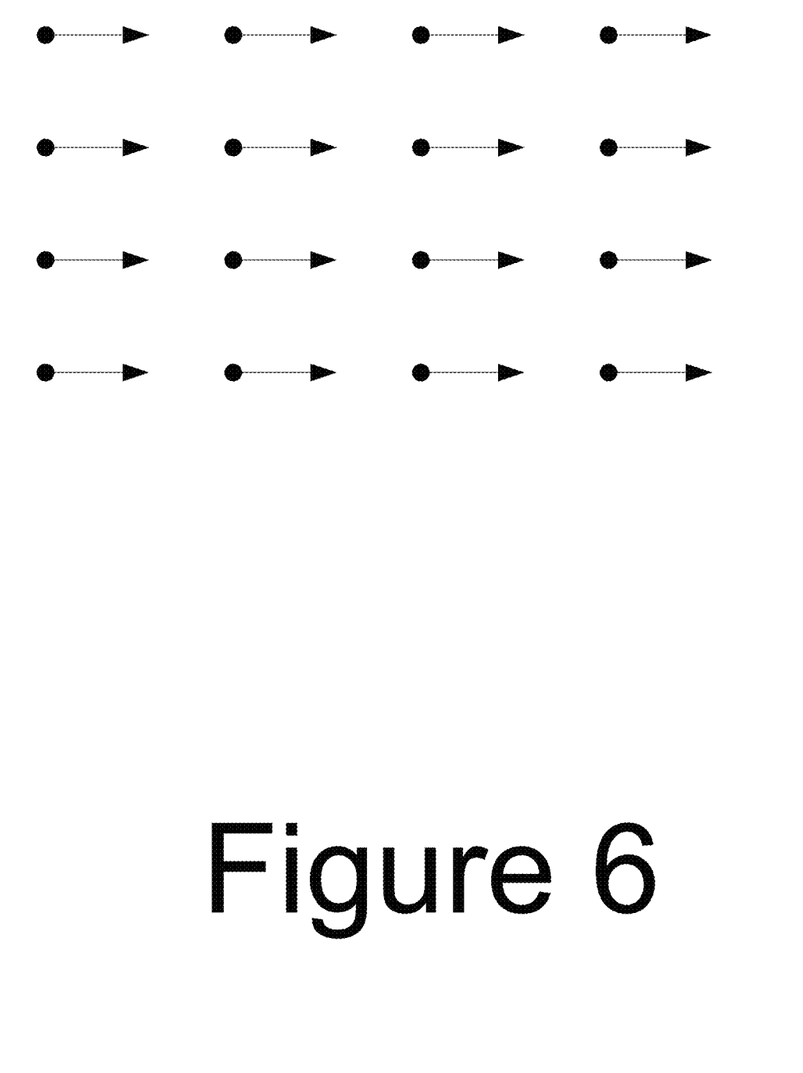
FIG. 6 displays a simplified optical flow diagram showing the relative motion between pixels making up a stored image and an observing camera.

FIG. 6 displays a simplified optical flow diagram 690 showing the relative motion between pixels making up a stored image and an observing camera. Because the pixels shift uniformly to the right, the camera must be moving to the left as it observes the scene, so that a "move cursor left" command is delivered to the external interface device. The optical flow logic can produce a simplified optical flow diagram using the calculated two-dimensional vector.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A device comprising:
   a microprocessor; and
   a memory coupled to the microprocessor, the memory to store a logic that, when executed by the microprocessor, causes the microprocessor to perform operations comprising:
      receiving an invitation to connect to an external interface device via a transceiver in communication with the microprocessor,
      determining that the external interface is configured to accept a remote mouse input,
      connecting to the external interface device,
      determining a motion information using a camera in communication with the microprocessor, and
      transmitting the motion information as the remote mouse input to the external interface device.

2. The device of claim 1, wherein the transceiver is one of a BLUETOOTH, WiFi, and cellular RF transceiver.

3. The device of claim 1, wherein the operations further comprise corresponding a keypad input with the remote mouse input.

4. The device of claim 1, wherein the transceiver is an optical communications channel.

5. The device of claim 1, further comprising a display in communication with the microprocessor, the display being one of an LCD or LED screen.

6. The device of claim 5, wherein the display is a touchscreen.

7. A system comprising:
   a portable network device having a processor, and
   a memory coupled to the processor, the memory to store an optical flow logic that, when executed by the processor, causes the processor to perform operations comprising:
      receiving, via a transceiver coupled to the portable network device, an invitation to connect to the external interface device;
      determining that the external interface is configured to accept a remote mouse input; and
      establishing a communication with the external interface device;
   wherein the portable network device transfers motion information from the camera as the remote mouse input to the external interface device.

8. The system of claim 7, wherein the external interface device has a graphical user interface enabling a selection of a plurality of portable network devices that are permitted to establish a remote mouse input connection to the external interface device.

9. The system of claim 8, wherein the permitted portable network devices are ranked.

10. The system of claim 9, wherein higher ranked portable network devices have priority in the event multiple simultaneous remote mouse inputs are received.

11. The system of claim 7, wherein the portable network device displays a list of external interface devices that can accept remote mouse input.

12. The system of claim 11, wherein the input device enables a selection of an external interface device to establish a remote mouse input connection.

13. A method, comprising:
   receiving, by a portable network device comprising a processor, an invitation to connect with an external interface device;
   determining, by the processor, that the external interface is configured to accept a mouse input;
   establishing, by the processor, the remote mouse input connection with the external interface device;
   determining, by the processor, a plurality of motion information of the portable network device via an optical flow sensor;
   translating, by the processor, the motion information into the mouse input; and
   wirelessly transmitting, by the processor, the mouse input to the external interface device.

14. The method of claim 13, further comprising:
   capturing successive images from a camera mounted to a portable network device; and
   determining a plurality of motion information based on the captured successive images.

15. The method of claim 13, wherein the establishing further comprises authenticating the portable network device as a remote mouse input connection.

16. The method of claim 13, further comprising selecting a movie on an interactive television.

17. The method of claim 13, further comprising drawing a picture on a desktop computer.

18. The method of claim 13, wherein the external interface device has a graphical user interface enabling a selection which portable network devices are permitted to establish a remote mouse input connection to the external interface device.

19. The method of claim 18, wherein the permitted mobile portable network devices are ranked.

20. The method of claim 19, wherein higher ranked devices have priority in the event multiple simultaneous remote mouse inputs are received.

* * * * *